US010740541B2

(12) United States Patent
Zambre et al.

(10) Patent No.: US 10,740,541 B2
(45) Date of Patent: Aug. 11, 2020

(54) FACT VALIDATION IN DOCUMENT EDITORS

(71) Applicant: Microsoft Technology Licensing, LLC, Redmond, WA (US)

(72) Inventors: Deepak Zambre, Bellevue, WA (US); Rohit Paravastu, Seattle, WA (US); Silviu-Petru Cucerzan, Redmond, WA (US); Rajeev Kumar, Bellevue, WA (US); Srivatsava Daruru, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/988,689

(22) Filed: May 24, 2018

(65) Prior Publication Data

US 2019/0361961 A1    Nov. 28, 2019

(51) Int. Cl.
*G06F 16/23* (2019.01)
*G06F 40/166* (2020.01)
*G06N 20/00* (2019.01)
*G06F 3/0482* (2013.01)
*G06N 5/02* (2006.01)

(52) U.S. Cl.
CPC .......... *G06F 40/166* (2020.01); *G06F 3/0482* (2013.01); *G06F 16/2365* (2019.01); *G06N 20/00* (2019.01); *G06N 5/02* (2013.01)

(58) Field of Classification Search
CPC ...................................................... G06F 17/30
See application file for complete search history.

(56) References Cited

U.S. PATENT DOCUMENTS

| | | | |
|---|---|---|---|
| 8,819,047 | B2 | 8/2014 | Cucerzan et al. |
| 10,387,469 | B1 * | 8/2019 | Zhang ..................... G06F 16/35 |
| 2011/0295888 | A1 * | 12/2011 | Hogue ..................... G06F 17/30 |
| 2011/0307435 | A1 | 12/2011 | Overell et al. |
| 2015/0339577 | A1 * | 11/2015 | Waltinger ................ G06N 5/04 |
| 2016/0306791 | A1 * | 10/2016 | Allen et al. ............. G06F 17/28 |
| 2016/0328467 | A1 * | 11/2016 | Zou et al. ................ G06F 17/30 |
| 2017/0177715 | A1 * | 6/2017 | Chang et al. ..... G06F 17/30705 |

(Continued)

OTHER PUBLICATIONS

Leopold et a., "Supporting Process Model Validation through Natural Language Generation", May 2014, IEEE, pp. 818-840.*

(Continued)

*Primary Examiner* — James J Debrow

(57) ABSTRACT

Representative embodiments disclose mechanisms to validate statements made as part of a document creation or editing process. As the user edits or creates a document using a document creation/editing application, statements made in the document can be submitted to a validation service in a proactive or reactive manner. The statement validation service receives the statement, resolves any coreferences using a coreference resolution process. Once coreferences in the statement have been resolved and replaced, entities are resolved using an entity resolution process. Predicates are then resolved using a predicate resolution process. Entity-predicate pairs are then used to traverse a knowledge graph to extract information relevant to the statement. Suggested corrections are created from the extracted information and presented to the user via the document creation/editing application.

20 Claims, 9 Drawing Sheets

(56) References Cited

U.S. PATENT DOCUMENTS

| | | | |
|---|---|---|---|
| 2018/0011830 A1* | 1/2018 | Iida et al. | G06F 17/24 |
| 2018/0032505 A1* | 2/2018 | Hoetzer et al. | G06F 17/3765 |
| 2018/0232443 A1* | 8/2018 | Deigo et al. | G06F 17/30 |
| 2018/0336183 A1* | 11/2018 | Lee et al. | G06F 17/27 |

OTHER PUBLICATIONS

Nanduri et al, "Requirements Validation via Automated Natural Language Parsing", Jan. 1995, IEEE, pp. 362-368.*

"Stanford's Multi-Pass Sieve Coreference Resolution System at the CoNLL-2011 Shared Task" by Heeyoung Lee, et. al. Stanford NLP Group, Stanford University, Stanford, CA 94305. 7 pages.

"A Multi-pass Sieve for Coreference Resolution" Karthik Raghunathan, et al. Computer Science Department, Stanford University, Stanford, CA 94305. 10 pages.

"Entity Linking to One Thousand Knowledge Bases", Ning Gao et al. University of Maryland, College Park. 12 Pages.

"Named Entities Made Obvious: The Participation in th ERD 2014 Evaluation", Silviu Cucerzan, Microsoft Research, 1 Microsoft Way Redmond, WA 98052. 5 pages.

"Automatic Suggestions of Factual Information", In Journal of IP.Com, Ip.Com Disclosure No. Ipcom000251949d, Dec. 12, 2017, 8 Pages.

Olivieri, Alex C., "Improving Automated Fact-Checking Through the Semantic Web", In the Proceedings of International Conference on Web Engineering, May 25, 2016, 7 Pages.

"International Search Report and Written Opinion Issued in PCT Application No. PCT/US19/032074", dated Aug. 8, 2018, 13 pages.

* cited by examiner

FACT VALIDATION IN DOCUMENT EDITORS

FIELD

This application relates generally to fact validation. More specifically, in some aspects, this application relates to using an online validation engine to validate the correctness of statements and facts entered into a document editor such as a word processor, spreadsheet editor and so forth.

BACKGROUND

Users today have high expectations that systems they interact with will be able to perform tasks and answer questions. For example, a user may desire a digital assistant or search service to answer a question such as "How tall is Mount Everest?" or "What is the capital city of Tanzania?". Users expect not only accuracy but also responsiveness when such questions are answered. They tend to have a low tolerance for incorrect answers or a system that takes too long to return an answer.

It is within this context that the present embodiments arise.

DETAILED DESCRIPTION

Figure 1:
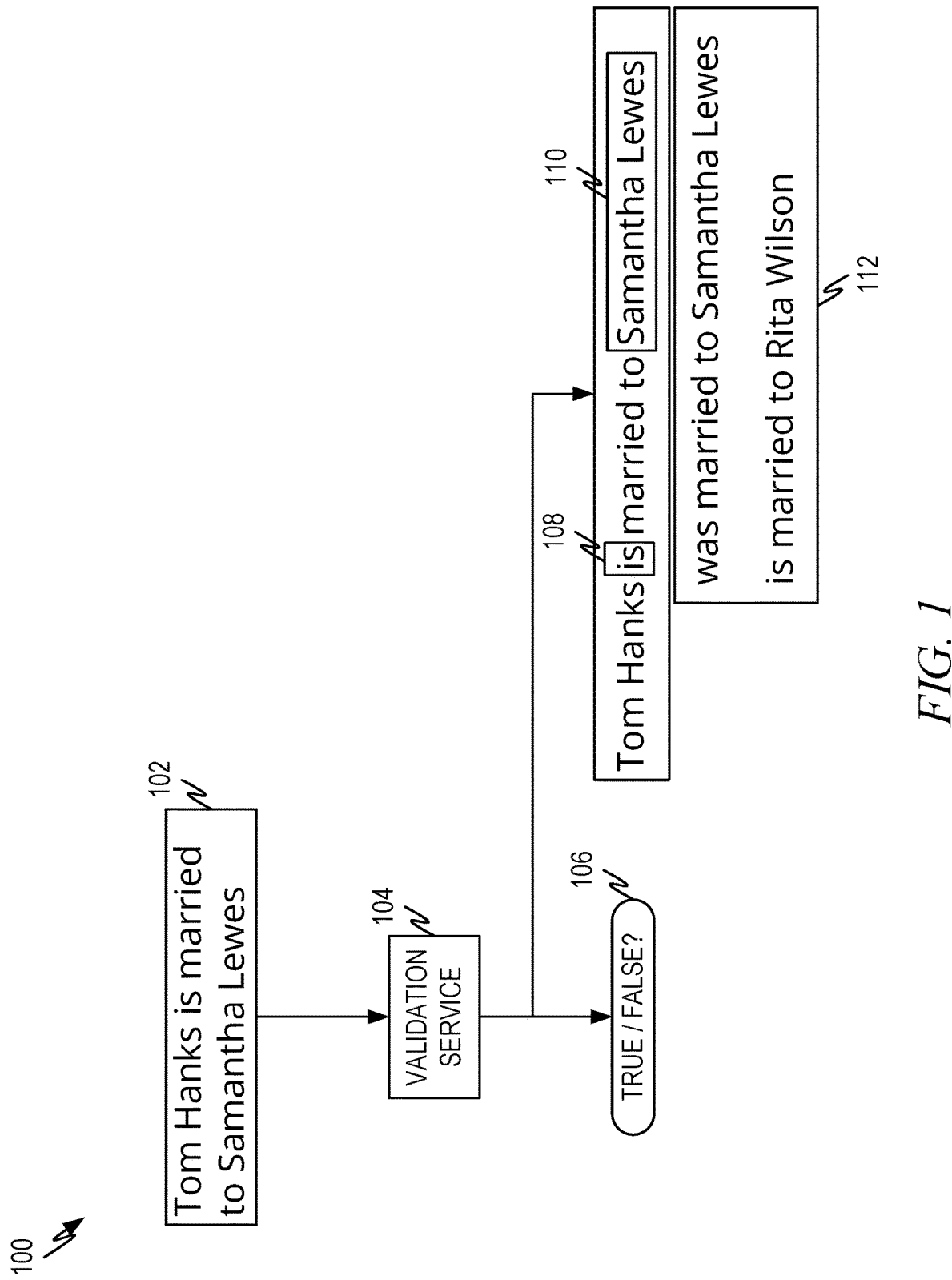
FIG. 1 is a representative diagram illustrating operation of a validation service according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Users enter all kinds of facts, statements and other information that is verifiable into documents as they create, edit, and otherwise interact with the documents. For example, a user may enter the statement "Mount Kilimanjaro, the tallest mountain in Africa, is located in Nigeria" when crafting a document. This statement both true and not true. Mount Kilimanjaro is the tallest mountain in Africa, but it is located in Tanzania and not in Nigeria. Currently, any fact checking is up to the user to perform and the user is solely responsible for the accuracy of any such statements and there no way to automate the validation of whether such statements are factual or not.

Some embodiments of the present disclosure utilize natural language processing and machine learning techniques to perform checking against factual information from an online knowledge base. Embodiments can indicate truth/falsity of statements found to be correct/incorrect, respectively. Additionally, or alternatively, the system can provide suggestions that allow the user to correct incorrect statements using an autocorrect interface.

Other embodiments of the present disclosure can utilize rule-based approaches either alone or in conjunction with one or more machine learning techniques and local knowledge base. Such may be appropriate, for example, in a device that is to operate in an offline manner.

A user can select a statement(s) that should be validated and submit the statement(s) to a system for checking. In some embodiments, this can be accomplished through actions such as selecting the statement to be checked and invoking a validation operation using one or more keys, a gesture, invocation of a user interface element, and/or so forth.

The statement(s) are submitted to a validation engine that utilizes natural language processing and machine learning to perform operations such as coreference resolution, entity resolution, predicate resolution, graph traversal, and so forth to check and/or autocorrect statements in the document.

In some embodiments, the system can fill in missing data. Thus, a user may type "Mount Kilimanjaro is the tallest mountain in Africa and is located in" and have the system fill in the missing fact. In still other embodiments, elements of a table that have already been provided by the user can be utilized to create statement(s) that can then be checked, and the empty elements of the table filled in with appropriate facts.

Description

A statement, as used herein, comprises at least one entity and a predicate that indicates a relationship between the at least one entity and at least one other entity. Often statements have two entities and a predicate that indicates a relationship between them, although more complex arrangements are possible. Thus, a statement such as "Tom Hanks is married to Rita Wilson" or "90068 is a zip code in Hollywood, California" have two entities and a predicate that indicates a relationship between them. In the first statement the two entities are "Tom Hanks" and "Rita Wilson" and the relationship is indicated by the predicate "is married to." In the second statement, the two entities are "90068" and "Hollywood, California" and the predicate is "is a zip code in."

Other statements have multiple entities and/or predicates. For example, the statement "Mount Kilimanjaro, the tallest mountain in Africa, is located in Tanzania" is equivalent to two statements. The first being "Mount Kilimanjaro [is] the tallest mountain in Africa" and the second being "Mount Kilimanjaro is located in Tanzania." Thus, the original phrase has three entities, "Mount Kilimanjaro," "Africa," and "Tanzania" and two predicates "[is] the tallest mountain in" and "is located in" that indicates the relationship between the entities.

A statement is correct when the relationship between the entities is correct. As disclosed herein, a statement may be incorrect because one of the entity is incorrect, such as "Mount Kilimanjaro is located in Nigeria" or because the relationship is incorrect, such as "Tom Hanks is married to Samantha Lewes." Thus, statements can be corrected by changing one or more entities, the relationship between entities or both.

FIG. 1 is a representative diagram 100 illustrating operation of a validation service 104 according to some aspects of the present disclosure. The validation service 104 receives a statement 102. In some embodiments of the disclosure, the validation service 104 works in conjunction with an application such as a word processor, spreadsheet application, or other document editor/creator. The application can be accessed as a service online or can be part of a user device, such as is illustrated in conjunction with FIG. 3 below. The statement 102 can come from the document that is being created/edited by a user via the application. In this case, the statement 102 is a natural language statement: "Tom Hanks is married to Samantha Lewes."

The validation service 104 receives the statement 102 and tests the validity of the statement according to the embodiments disclosed herein. The output of the testing can in two forms that can be presented in the alternative or together, depending on the embodiment.

In one aspect, the validation service 104 can identify whether a statement is true or false 106, which can also be expressed as valid or invalid, correct or incorrect, or any equivalent terminology. Such an indicator may be useful, for example, in informing the user that the statement under consideration is correct.

When the statement 102 is incorrect, in some embodiments it may be sufficient to inform the user that the statement is incorrect. In other embodiments, it may be useful to inform the user as to how the statement is incorrect and to allow the user to autocorrect the statement. This is illustrated in FIG. 1 by the other form of output.

The output to the validation service 104 can be annotations placed in the statement 102 that indicates to the user the presence of one or more incorrect aspects of the statement. Some statements can only be corrected in one fashion. Thus, a statement such as "George Washington was 5 feet 7 inches tall" can only be reasonably corrected by inserting the correct height of George Washington (6 feet 2 inches). Of course, the statement could be made true by inserting the name of someone who was 5 feet 7 inches tall, but such would be an unlikely correction to suggest as any number of people could fit that statement and it is unlikely that a user would make an error in the individual they are talking about.

For statements that are correctable with only one likely change, embodiments can automatically correct the statement. Additionally, in these embodiments, an indication of what was changed can be presented so the user understands the changes that were made by the system. For example, changes can be indicated visually the correct and/or incorrect information. For example, highlight, underline, strike out, color, and/or other format changes or combinations thereof can be used to indicate where and how the statement should be corrected. Additionally, or alternatively, the system can automatically correct the information and indicate what has been corrected. Other indicators can also be used such as placing the incorrect/correct information in some relationship to the correct/incorrect information (above/below), by placing the incorrect/correct information in a particular location on the display, and/or other indicators. Additionally, or alternatively, the correct and/or incorrect information can be shown using markup indicators such as placing the correct information above a stuck-out version of the incorrect information. Other indicators and formatting can also be used as long as the user can identify any changes that were made, how the statement can be or should be corrected, and/or actions needed to make the corrections, if they aren't automatically made.

When correction to the statement is appropriate, if only one way to correct the statement exists, the system can automatically correct the statement, can show a marked-up version of the statement, or otherwise indicate how the statement should be corrected.

Consider the statement in the figure, "Tom Hanks is married to Samantha Lewes." This statement has two entities (Tom Hanks and Samantha Lewes) and a predicate that indicates the relationship between them (is married). The statement is incorrect, since the current relationship between Tom Hanks and Samantha Lewes is not "is married." The statement can thus be corrected in one of two ways. The first is to keep the predicate "is married" and change the entity "Samantha Lewes" to the correct entity, "Rita Wilson." The second is to correct the predicate "is married" to "was married" and leave the two entities unchanged. These possible corrections are identified by the validation service 104 as described herein.

When, such as in the example of the figure, multiple ways exist to correct the statement, the user can be presented with one or more indicators 108, 110 which allow the user to access a drop down 112 or other ways to select the way they would like the statement corrected. In the representative drop down 112, the two ways to correct the statement are presented and the user can select one to make the statement correct.

As discussed herein, whether the validation service identifies one or multiple ways to correct a statement can depend upon the likelihood of each correction.

Figure 2:
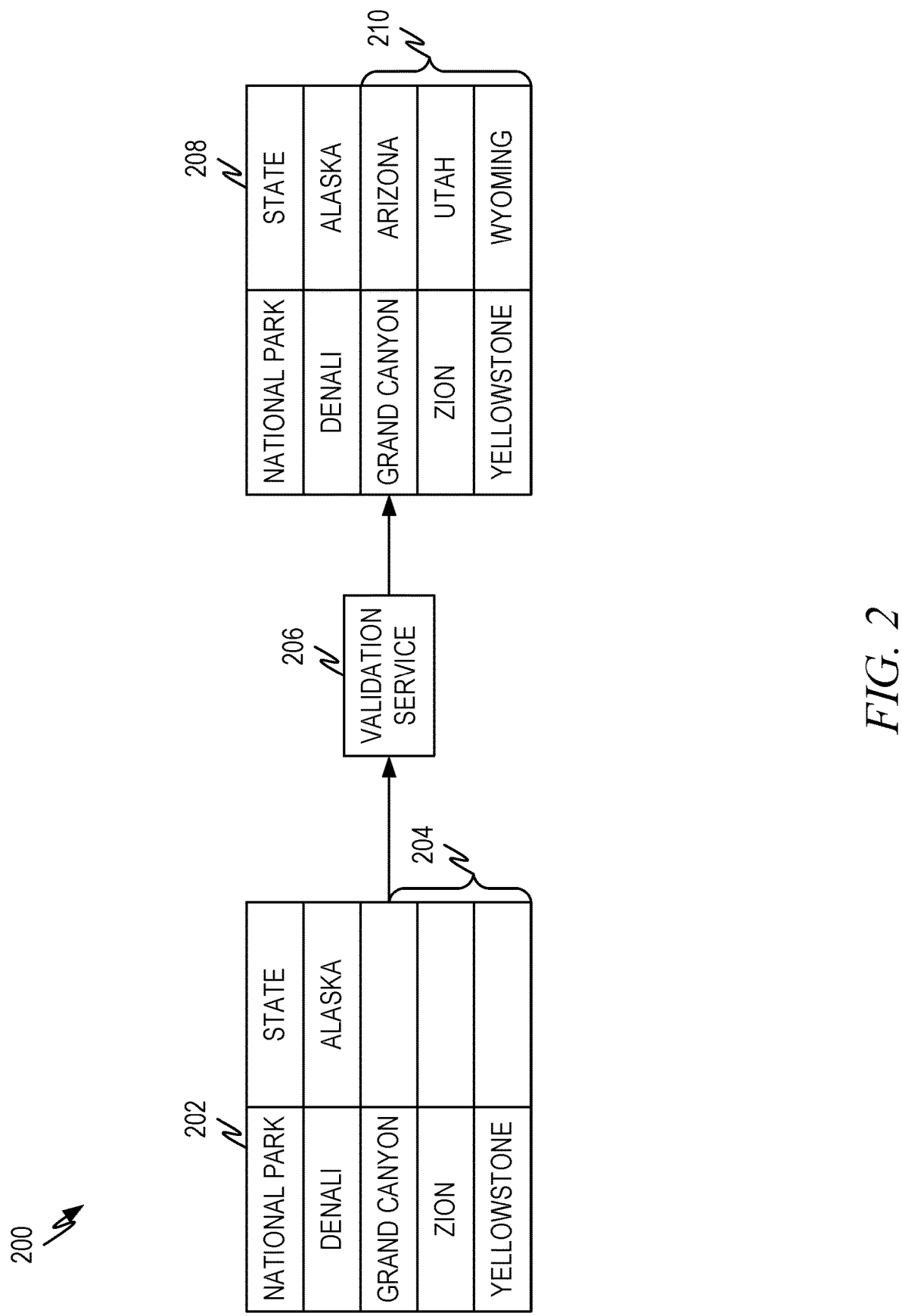
FIG. 2 is a representative diagram illustrating operation of a validation service according to some aspects of the present disclosure.

FIG. 2 is a representative diagram 200 illustrating operation of a validation service 206 according to some aspects of the present disclosure. In this example, the validation service 206 operates not on natural language input, but on a table with missing data 202. The table 202 has two columns one labeled "National Parks" and the other labeled "State." In this case, the goal of the validation service 206 is two-fold. The first is to check the data already entered in the table and the second is to fill in the missing data 204.

When the validation service 206 operates on tables, the headings in the table (if any) can give clues as to what data the table contains. Thus, the two columns labeled "National Parks" and "State" indicate the type of data contained on the table. What is missing, however, is an explicit statement of relationship between the two. As disclosed herein, the validation service can infer the relationship between the two columns from the column headings, from the data that has already been filled in, or both. In this case, the relationship between the two columns of data can be expressed as a predicate such as "is located in."

A knowledge graph and other tools, as described herein, can infer the relationship between the objects and then use that relationship to fill in the missing data 210.

Figure 3:
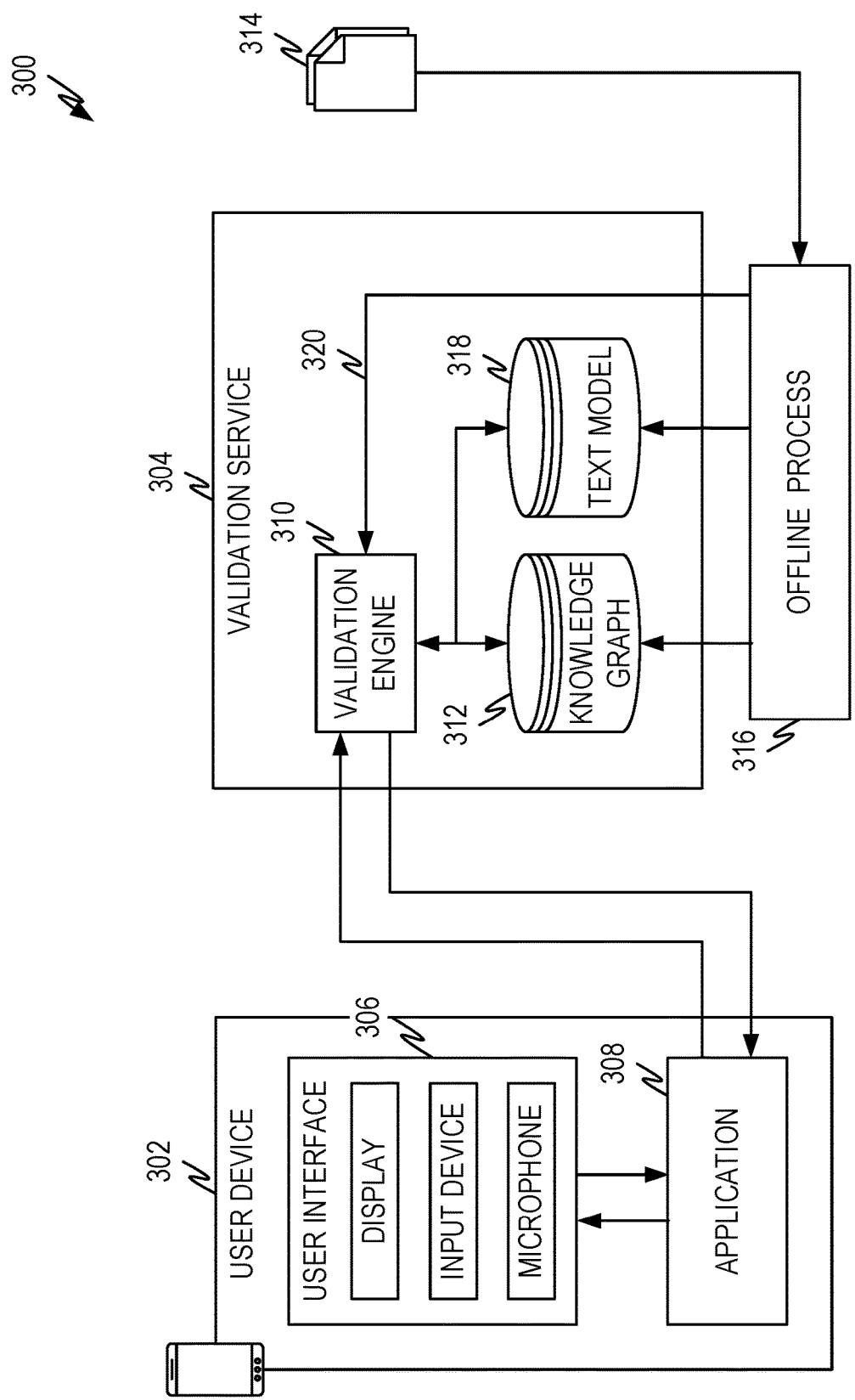
FIG. 3 illustrates a representative system architecture showing a validation engine according to some aspects of the present disclosure.

FIG. 3 illustrates a representative system architecture 300 showing a validation engine 310 according to some aspects of the present disclosure. In this architecture, the validation engine 310 is part of a validation service 304 that can be utilized by an application 308 to check statements entered by a user via a user device 302 as part of document creation, editing, and so forth.

The user device 302 can be any device that a user can create, edit, review, or otherwise interact with a document on. A document in the context of this disclosure is a file or other data structure located in or on one or more storage media that contains one or more statements. Thus, a document can be a spreadsheet, word processing document, note taking document, entry in a calendar, or any other document. In addition, the text entered into a chat window (such as in a chat application) can also be considered to be a document as it resides in memory as it is entered into the application. The user device 302 typically comprises some sort of a user interface 306 that allows the user to interact with a document through one or more applications 308. In FIG. 1 the application is shown as resident on the user device 302 but can also reside entirely or partially on a network server, such as with web-based document creation, editing, and/or review. Similarly, the document can reside locally on the user device 302 or can be accessed remotely.

The application 308 interacts with the validation service 304 in either a proactive or reactive manner to check the correctness of statements in a document. For example, as a user enters, edits, or reviews statements in a document, the application 308 can be proactively submitting the statements to the validation service 304 to check correctness of the entered statements. As another example, the application 308 can wait for the user to ask for one or more statements to be checked in a reactive manner. Furthermore, some embodiments can use a combination of the proactive and reactive approaches.

Not all statements may be appropriate for checking with a validation service. For example, a statement that makes a factual assertion ("Alaska has 663,268 square miles and is the largest state in the United States") can be checked for correctness. However, when no factual assertion is made or when the assertion cannot be checked ("May is my favorite month of the year"), the statement cannot readily be checked for correctness.

Grammatical construction or other indicators can separate statements suitable for checking from those not suitable for checking. Thus, statements that express an opinion or are associated with relative terminology that cannot be quantified may not be suitable for checking. Thus, statements submitted to the validation service 304 can first be filtered for suitability or can be filtered as they come into the validation service 304 for suitability prior to checking. Additionally, or alternatively, at any point in the validation process, if the validation engine is unable to validate the statement, the process can be terminated and an "unable to validate" indication returned to the application and presented to the user, as appropriate.

The validation service 304 comprises a validation engine 310, which performs the validation of statements as described herein, and one or more knowledge graphs 312, and/or one or more ontologies 318. As explained herein, the knowledge graph(s) 312 comprise facts regarding entities and relationships. The ontologies 318 are the ontologies of the one or more knowledge graph(s) 312 and represent a knowledge graph ontology to text mapping.

The knowledge graph(s) 312 and ontologies 318 are compiled in an offline process 316 using information 314. Information 314 can be from one or more knowledge bases, such as domain-specific knowledge bases derived from information sources such as Wikipedia, or other knowledge bases compiled from available information sources. Additionally, the offline process 316 can comprise training of machine learning and other models used by validation engine 310.

Figure 4:
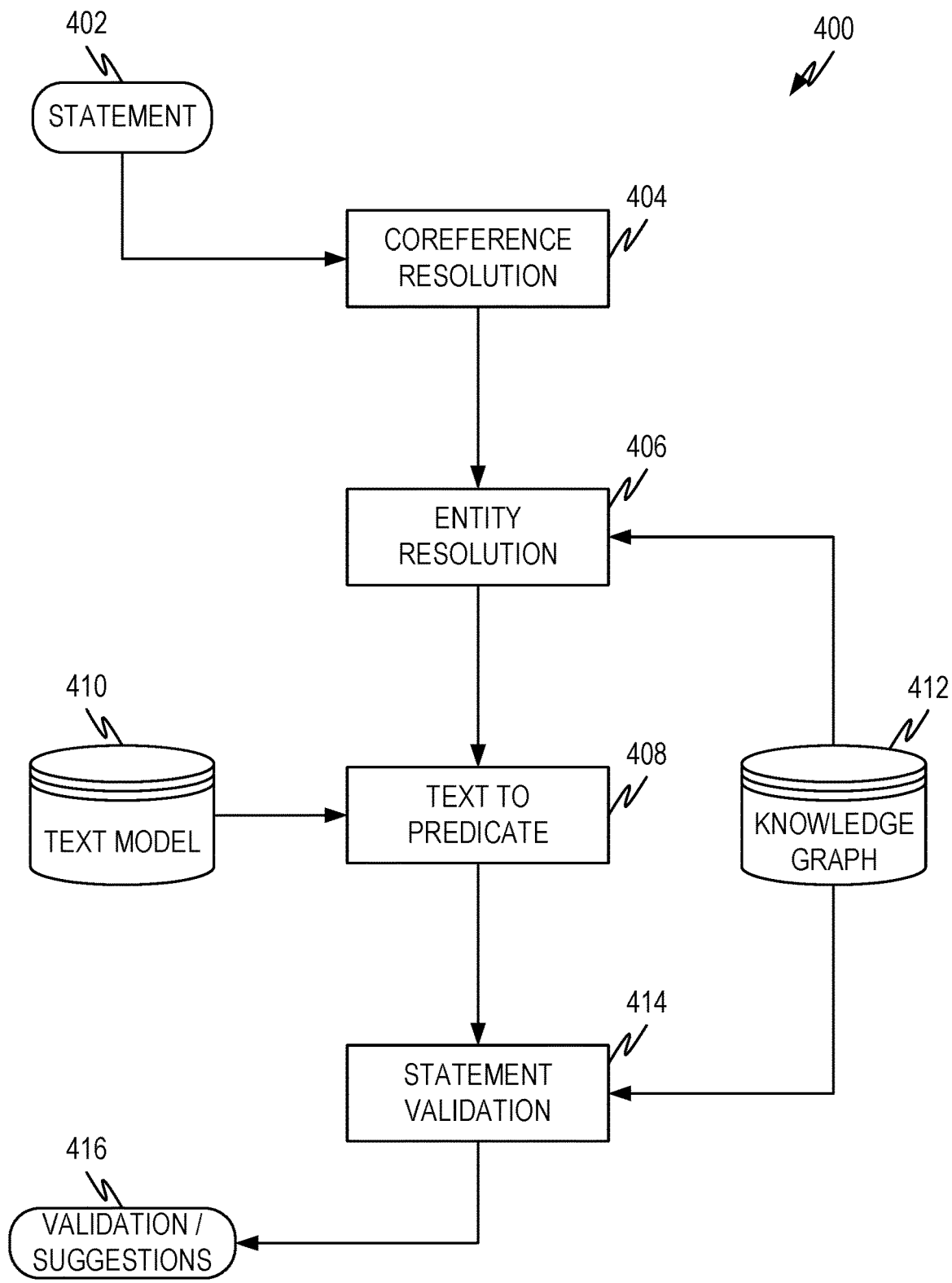
FIG. 4 illustrates a representative system architecture for a validation engine according to some aspects of the present disclosure.

FIG. 4 illustrates a representative system architecture 400 for a validation engine such as validation engine 310 according to some aspects of the present disclosure. A statement 402 is received by the validation engine. In describing this architecture and flow diagram, three representative statements will be used as examples. These statements are:

1. Tom Hanks is an actor. He is married to Samantha Lewes.
2. Mount Killimanjaro is located in Kenya.
3. He played left back for United.

Often statements 402 contain pronouns and other coreferences that must be resolved before the validation can continue. For example, second half of representative statement #1 and #3 have pronouns that must be resolved. Coreference resolution is performed in operation 404. Coreference resolution is the process to understand the context of the statement, the subjects mentioned and their interaction. Coreference resolution is the task of finding all expressions that refer to the same entity in a text. This comprises, among other things, resolving any pronouns in the statement, typically by referencing the surrounding context. For example, representative statement #1: "Tom Hanks is an actor. He is married to Samantha Lewes." has a pronoun "he" in the second portion that needs to be resolved. Coreference resolution determines that the "he" in the second portion refers to "Tom Hanks." The coreference resolution process 404 makes the appropriate substitutions in the statements so that all coreferences have been resolved.

Many known methods for coreference resolution exist. A common technique for resolving pronouns is to look for the nearest preceding entity that is compatible with the referring expression. For example, "she" would only be used to refer to the closest female subject rather than a male subject. A suitable coreference method for use in the embodiments of the present disclosure is the coreference engine provided by the Stanford Natural Language Processing group. The Stanford coreference engine is part of the Stanford CoreNLP natural language processing software and is available as of this writing on the internet at "https://stanfordnlp.github.io/CoreNLP/". Other methods exist and are known and can also be used.

Figure 5:
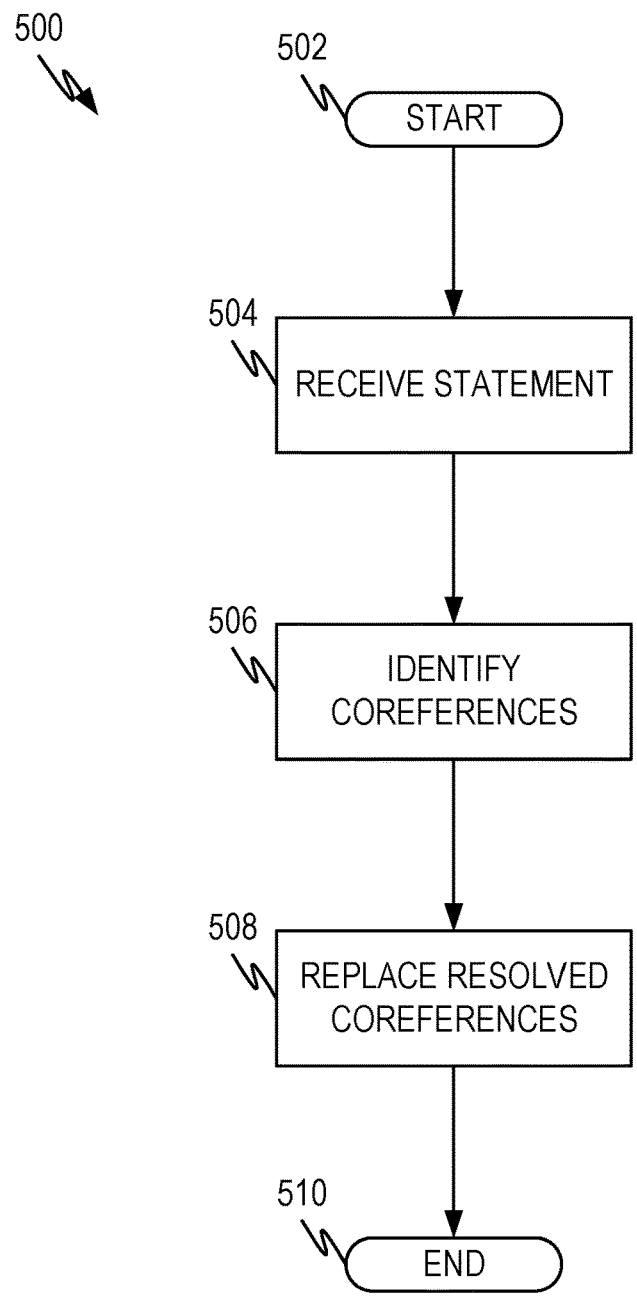
FIG. 5 illustrates a representative flow diagram for coreference resolution according to some aspects of the present disclosure.

Turning for a moment to FIG. 5, a flow diagram representing the operations performed by coreference resolution process 404 are presented.

The flow diagram begins at operation 502 and proceeds to operation 504 where the statement under consideration is received. In some instances, contextual information along with the statement under consideration is also utilized. In other words, as described above, often coreference resolution requires examining the surrounding text to identify how the coreferences should be resolved. Thus, more than just the statement is often utilized when resolving coreferences.

The statement and any contextual surrounding text are submitted to a model, such as the coreference engine of the Stanford CoreNLP in operation 506. The output of the coreference engine is typically a representation of how coreferences are resolved.

Operation 508 then replaces instances that refer to the same entity with the text of the entity. Thus, pronouns and other coreferences that are resolved to the same entity are replaced in the statement. This can include replacing a shortened form of an entity with a consistent representation. Thus, if the statement under consideration is "George was a tall man, standing six foot two inches," and the coreference engine resolves "George" to "George Washington," the instance of "George" can be replaced with "George Washington" even though no pronouns exist in the statement.

The method ends at operation 510.

Carrying on with the three representative statements, after coreference resolution 404, the three representative statements are:

1. Tom Hanks is an actor. Tom Hanks is married to Samantha Lewes.
2. Mount Killimanjaro is located in Kenya.
3. Kieran Gibbs played left back for United.

In representative statement #3, the surrounding context (not given here) indicates that "he" should be resolved to "Kieran Gibbs."

Returning to FIG. 4, after coreferences in the statement have been resolved, entity resolution is performed as indicated in operation 406. Entity resolution is the process of understanding the primary entities that the statement is talking about. Entity resolution, sometimes referred to entity detection and liking (EDL), performs two functions: 1) recognizes the entities in the statement; and 2) disambiguation of the entities in the statement. Entity resolution is trained to recognize entire entities such as "Tom Hanks" and not just "Tom" and "Hanks". Similarly, in representative statement #3, the entity "United" can refer to several entities such as United Airlines, Manchester United, United States and so forth.

Entity resolution 406 can utilize a knowledge graph 412 to recognize and disambiguate the entities. A knowledge graph comprises entities, their semantic types, properties and relationships between the entities. Entries in a knowledge graph are often stored in a format that allows quick traversal and retrieval, such as "triple" having a subject/predicate/object combination. The knowledge graph is used in conjunction with a trained machine learning model or other engine to resolve the entities in a statement. For example, a corpus of training data can be extracted from Wikipedia and/or other knowledge base and used to build the knowledge graph. The knowledge graph can then be searched to identify and resolve entities.

Many entity resolution methods are known. A suitable methodology is described in "Cucerzan, S.: Named Entities Made Obvious: the participation in the ERD 2014 evaluation. In: ERD@SIGIR. pp. 95-100, available at: http://dblp.uni-trier.de/db/conf/sigir/erd2014 (2014) which describes a model called NEMO (Named Entities Made Obvious). NEMO is trained offline to recognize knowledge base (e.g., Wikipedia) entries from input text. Thus, when text, such as the representative statements used herein, are presented to NEMO by the entity resolution process 406, NEMO returns entities associated with the knowledge base entries that correspond to the text in the statement. The knowledge base entries indicate the entities in the text and disambiguate the entities.

Figure 6:
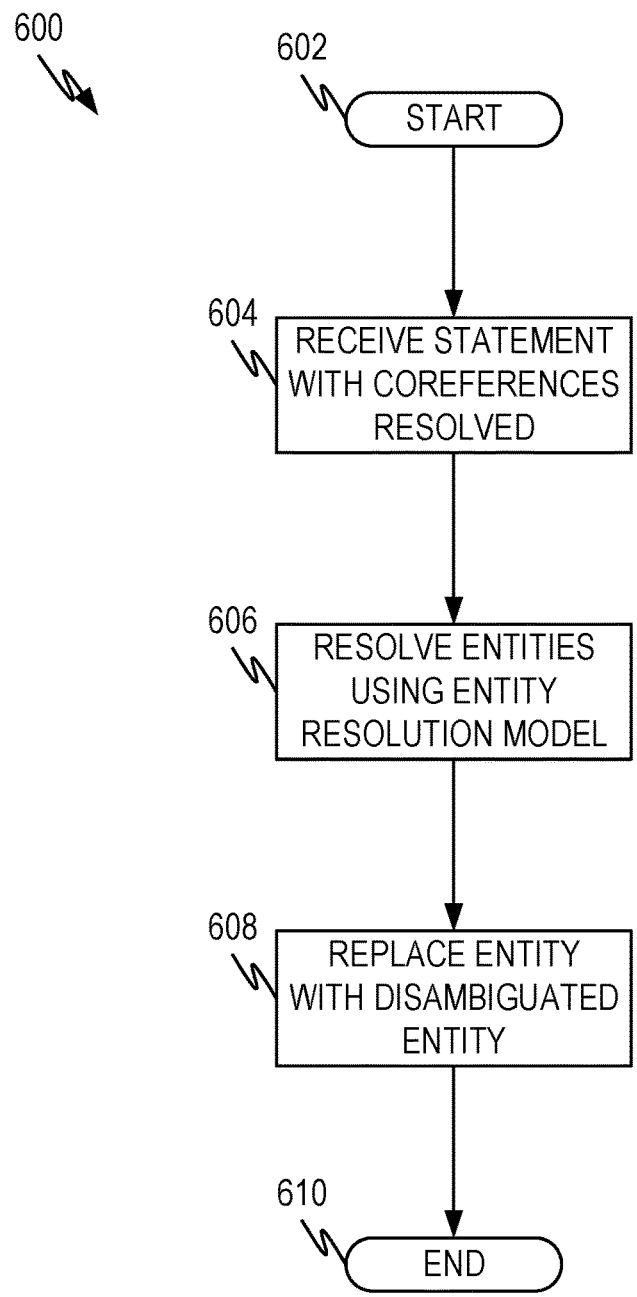
FIG. 6 illustrates a representative flow diagram for entity resolution according to some aspects of the present disclosure.

Turning for a moment to FIG. 6, a representative flow diagram of the operations in entity resolution 406 is presented. The flow diagram begins in operation 602 and proceeds to operation 604 where the statement with previously resolved coreferences (if any) is received.

In operation 606, the entity resolution model is used to resolve the entities in the received coreference resolved statement. As discussed, a suitable way to do this is to present the coreference resolved statement to a trained NEMO model. Operation returns entities that have been disambiguated if necessary.

Operation 608 replaces entities from the statement with disambiguated entity names and tracks the entities/disambiguated entities from the statement for further use as described below.

Returning now to FIG. 4, after the entity resolution process 406 may resolve the entities in the representative statements as:

1. Tom Hanks is an actor. Tom Hanks is married to Samantha Lewes.
Entities: Tom Hanks, actor, Samantha Lewes
2. Mount Killimanjaro is located in Kenya.
Entities: Mount Killimanjaro, Kenya.
3. Kieran Gibbs played left back for Manchester United.
Entities: Kieran Gibbs, left back, Manchester United
Disambiguation identifies that "United" refers to "Manchester United" a football (soccer) club in the UK.

Once entity resolution 406 is performed, predicate resolution process 408 identifies the relationships between the entities. For predicate resolution 408 the type of the entities in a statement can be more important than the actual entities themselves. Thus, a text model 410 can be extracted from the knowledge graph 412 and/or the knowledge base(s) that the knowledge graph is built from. The text model 410 is derived from the vocabulary in the knowledge graph 412 and/or the knowledge base(s) from which the knowledge graphs are constructed. The model is used to map the text in the predicates of the statements to the relationships in the knowledge graph 412. Thus, the predicate resolution process 408 uses the model to convert the predicate portion of the statement (i.e., statement with entities removed) to relationships that are known in the knowledge graph 412.

In a representative embodiment, Word2vec, cosine similarity, Gensim, Latent Dirichlet Allocation (LDA), tensor flow or other such models/tools are used to perform semantic analysis to identify the relationships between the entity types.

Without loss of generality, some of these example models are shallow, two-layer neural networks that are trained to reconstruct linguistic contexts of words. As a representative example, Word2vec takes as input a training corpus of text and produces a high-dimensional space (typically between a hundred and several hundred dimensions). Word2vec will be used as a representative example for predicate resolution, although other machine learning models, cosine similarity, and so forth can be instead of Word2vec. In predicate resolution 408, the training corpus of text is the from the knowledge graph 412, which models the relationships between types of entities. Each unique word/word vector in the corpus is assigned a corresponding vector in the space. The vectors are positioned in the vector space such that words that share common contexts in the corpus are located in close proximity to one another in the space. Thus, after training, word2vec will convert the predicate in the statement to relationship(s) in the knowledge graph 412.

Once the entities are identified by the entity resolution process 406, the entities can be removed from the statement and the remaining predicate(s) passed to the trained machine learning model such as a trained word2vec model. When the predicates are subject to this type of analysis, the predicates map to entries into the ontology. This mapping yields the ontology relationship(s) that will correspond to the predicate values. For example, the predicate "is married to" can map to "marriage→spouse" relationship in the ontology model. Thus, the trained word2vec model can be used to extract the relationships between the entity types. If the relationships are close to other relationships, multiple candidate relationships can be extracted and weighted based on a distance measure from the original mapping.

Figure 7:
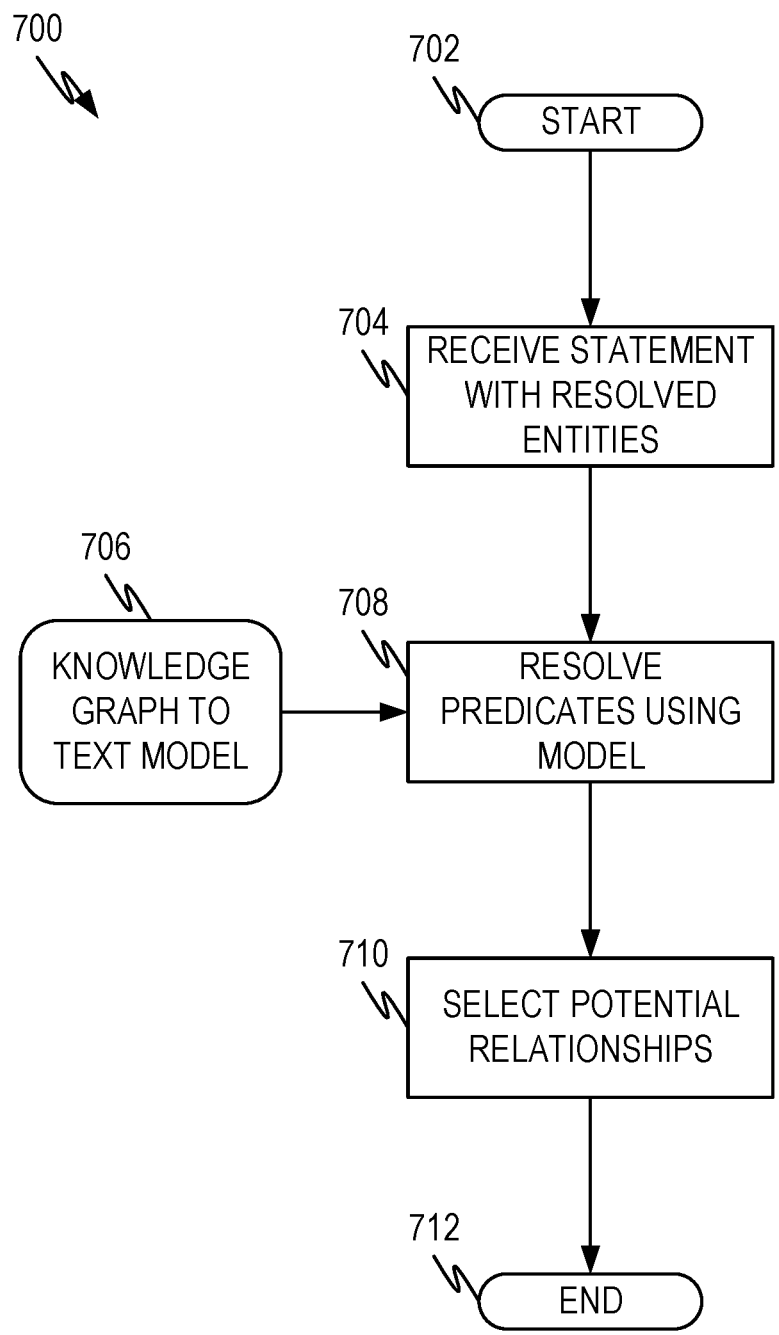
FIG. 7 illustrates a representative flow diagram for predicate resolution according to some aspects of the present disclosure.

Turning for a moment to FIG. 7, a flow diagram for a representative predicate resolution process 408 is presented. The method begins at operation 702 and proceeds to operation 704, where the statement with resolved entities from entity resolution process 406 are received.

Operation 708 uses the trained knowledge graph to text model, such as the previously described trained word2vec model, to resolve the predicates in the statement. The result is a list of relationships that are associated with the entities in the statement.

operation 710 selects predicates that are likely to be relevant to the validation process. For example, if a trained word2vec model is used, not only the exact mapping of the predicate text to the relationship of the knowledge graph 412, but those within a threshold distance of the exact mapping to select those that are likely to be relevant. A score for a location in the vector space can be calculated based on a distance measure from the exact mapping so that scores that are closer to the exact mapping location have higher scores and those that are farther from the exact mapping location have lower scores. The scores can then be compared to a threshold and those that exceed the threshold selected for further processing.

In practice the number of relationships selected by the trained model will be relatively small.

The method ends at operation 712.

Returning to FIG. 4, for the three representative statements, the word2vec model may give the following possible relationships:

1. Tom Hanks is an actor. Tom Hanks is married to Samantha Lewes.
   possible relationships: occupation; marriage→spouse.
2. Mount Killimanjaro is located in Kenya.
   possible relationships: location.
3. Kieran Gibbs played left back for Manchester United.
   possible relationship: occupation→player; player→position.

The statement validation engine 414 is the core engine that picks the entities and predicates inferred from the user text (the identified entities and relationships output above) and locates correct objects, literal values, and/or relationships in the knowledge graph 412. Basically, the entities and/or relationships that are derived from the entity resolution process 406 and the predicate resolution process 408 become search criteria for the knowledge graph 412 to retrieve the information needed to check the factual assertions of the statement.

The statement validation engine 414 can utilize a graph engine or other search mechanism to retrieve object/literal value for a given entity and relationship, retrieve all relationships for a value of an entity, and find the existing paths (relationships) between pairs of entities. These can then be compared to the statement to identify which match and which do not.

Figure 8:
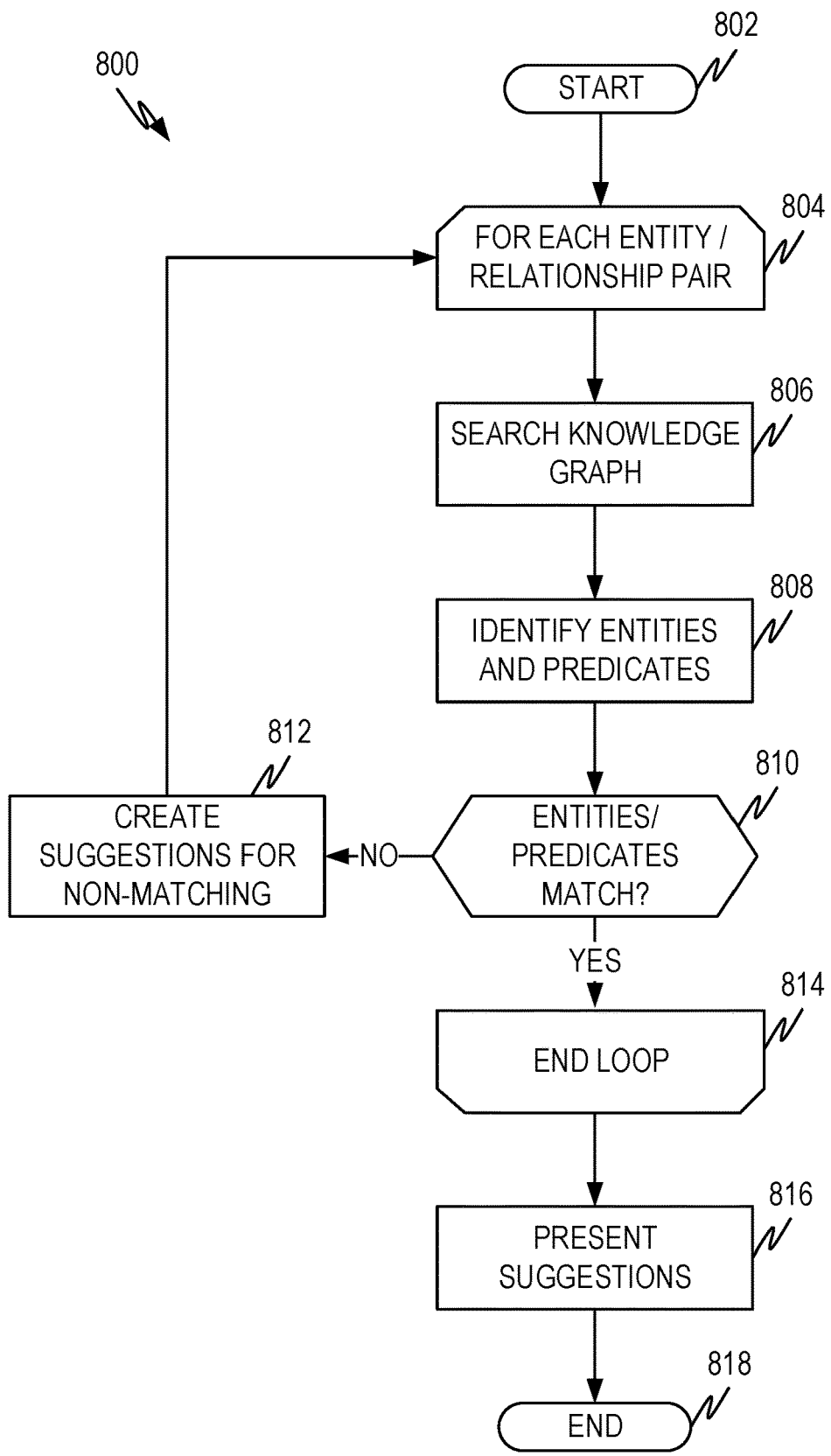
FIG. 8 illustrates a representative flow diagram for statement validation according to some aspects of the present disclosure.

Turning for a moment to FIG. 8, one process for the statement validation process 414 is illustrated. The process begins at operation 802 and proceeds to operation 804 which begins a loop that loops across each entity/relationship pair. The entity and relationship that are utilized for the loop beginning with operation 804 is the entity and relationship that provides the basis for the changes that will be suggested. In other words, the relationships, objects, literals and so forth retrieved from the knowledge graph 412 will be relative to the entity used in the search.

For example, in the phrase "The Colorado Gold Rush began in 1848" is incorrect but can be corrected in one of two ways. The Colorado Gold Rush began in 1858. The California Gold Rush began in 1848. Thus, the statement could be corrected by changing Colorado Gold Rush to California Gold Rush or by changing the date from 1848 to 1858.

If the knowledge graph 412 is searched with the entity/relationship pair of which indicates the entity of Colorado Gold Rush and the relationship of when the gold rush started, then the knowledge graph will return 1858 among other items. Suggested changes would thus fix the entity Colorado Gold Rush and include suggestions to correct the date. If, however, the knowledge graph was searched with the entity/relationship pair of the date 1848 and the relationship of when the gold rush started, then the knowledge graph will return, among other things, the California Gold Rush. Suggested changes would fix the date 1848 and include suggestions to correct the entity associated with the date.

In some embodiments, the first entity in the statement is taken as "fixed" and the knowledge graph searched using the first entity and appropriate relationships. In other embodiments, all entities that have been resolved are searched using appropriate relationships.

In operation 806, the knowledge graph is searched with the entity/relationship pair and results retrieved. In operation 808 the entities and predicates in the statement under consideration are identified. Operation 810 compares the information retrieved from the knowledge graph to the entities and predicates in the statement under consideration.

The comparison operation 810 identifies one or more possible incorrect aspects of the statement when entities and/or predicates of the statement do not match what is retrieved from the knowledge graph. If all entities and/or predicates of the statement match what is retrieved from the knowledge graph, then no incorrect aspects exist based on what was retrieved.

Matching is performed in one embodiment by text matching. For example, string comparison, stemming, edit distance or other mechanisms can be used to identify when the entities and/or predicates match what is retrieved from the knowledge graph. Thus, in some embodiments the text strings themselves do not have to be exactly the same in order to match. They only need refer to the same thing or be semantically the same. In other embodiments, stricter matching rules can be applied.

When the items match, the "yes" branch of operation 810 is taken and the next entity/relationship pair are selected and the loop repeated if entity/relationship pairs exist to be searched or the loop ends if no entity/relationship pairs exist to be searched.

When items do not match, the "no" branch of operation 810 is taken and operation 812 creates suggestions for correction based on the non-matching aspects. Suggestions for correction are created by creating or using phrases and/or objects retrieved from the knowledge graph.

As examples, considering the first of the three representative statements:

1. Tom Hanks is an actor. Tom Hanks is married to Samantha Lewes.

For representative statement #1, the statement "Tom Hanks is an actor" is correct and no suggestions will be generated since the information retrieved from the knowledge graph 412 will match what is in the statement. For the statement "Tom Hanks is married to Samantha Lewes" the information retrieved from the knowledge graph 412 will differ in two aspects. The first is that the knowledge graph will indicate that the current spouse of Tom Hanks is Rita Wilson. The information will also indicate that the former spouse of Tom Hanks is Samantha Lewes.

Operation 810 will note these differences in the matching process and operation 812 will create suggestions based on the information from the knowledge graph. If the phrases from the knowledge graph is compatible with the form of the statement under consideration they can be used directly. Thus, if the knowledge graph returns "is married to," and the literal "Rita Wilson" the phrase can be used directly to create the suggested correction "is married to Rita Wilson." If the phrase is not compatible with the form of the statement under consideration, appropriate corrections can be made.

Natural language processing can be used to create and test an appropriate correction phrase. Numerous methods are known and can be used. One possible mechanism is to utilize grammar rules to test whether a potential phrase is appropriate.

Such a process would proceed by first creating a potential suggested correction phrase, merging it into the statement by replacing the appropriate portion of the statement, and then testing the resultant statement against grammar rules.

If the resultant corrected statement complies with grammar rules, the phrase can be used as a suggested correction. If the resultant phrase does not comply with proper grammar rules, appropriate corrections to the phrase can be made based on the grammar rules and the corrected phrase used as a suggested correction.

As operation 812 is performed during the various iterations of the loop, the suggested corrections can be kept until the loop is complete. Once execution proceeds to operation 816, the various suggested corrections that have been identified through the loop can be evaluated and a subset (i.e., all or part) of the suggested corrections presented to the user using one or more of the mechanisms described herein.

The suggested corrections are likely to be few in number. In such a situation, all suggestions can be presented. If, however, the number exceeds a threshold, less than all the total number can be selected using a selection criteria for presentation.

In the situation where no suggested corrections exist (operation 810 indicates entities and/or predicates match), there are no suggestions to be presented to the user and the system can indicate that the statement is correct by presenting an indicator to the user or by having no indicator. In this latter option, the absence of any suggested corrections can be taken to indicate the statement is valid.

The method ends at operation 818.

Returning to FIG. 4, the suggested corrections and/or validation are represented by 416. For the three representative statements, the following corrections can be indicated:

1. Tom Hanks is an actor. Tom Hanks is married to Samantha Lewes.

The latter statement is incorrect and the suggested corrections can be:
"is married to Rita Wilson"
"was married to Samantha Lewes"

2. Mount Killimanjaro is located in Kenya.
The statement is incorrect and the suggested correction is to change "Kenya" to "Tanzania".

3. Kieran Gibbs played left back for Manchester United.
The statement is incorrect and the suggested correction is to change "Manchester United" to "Arsenal".

Although the above description utilized trained machine learning models and natural language processing to perform the functions of coreference resolution 404, entity resolution 406, text to predicate resolution 408, and/or statement validation 414, one or more of the models can be augmented or replaced by a more rules-based approach, for appropriate situations and embodiments. For example, one or more sets of rules can be created to resolve entities using information from a local or remote knowledge graph. In some instances, specific knowledge can be coded into a set of rules. Such rules may account for common entity references in a knowledge domain. For example, in a geographic knowledge domain rules can be created for common entity resolution like capital cities of states, states or provinces of countries, and so forth. Such may be particularly useful where a limited knowledge set is used on a device that operates independently of a network connection (e.g. offline) some or all of the time.

Similar approaches can be taken for any or all of coreference resolution 404, text to predicate resolution 408, and/or statement validation 414.

The above description mainly deals with statements in the form of text, like the three representative statements used as examples throughout the description. For embodiments, such as those shown in FIG. 2 or where the user requests the system fill in a missing entity or fact, where the statement is in the form of missing information, the process is the same, mutatis mutandis, except that there is no need to identify which entity in the statement should change.

For example, in the embodiment of FIG. 2, the column headings and the already filled in information allows the user to identify what the relationship between the first column of entities and the second column of entities is. In this case, we have two entities (a national park and a state) and the system's task is to 1) identify the relationship between the identified entities, and 2) extract the missing entities from the knowledge graph.

The process of FIG. 4 can be used as previously explained to accomplish the two specified tasks. The coreference resolution process 404 need not be used in some situations since there are no coreferences to be resolved. This is the case in the table 202 of FIG. 2.

The entity resolution process 406 and the predicate resolution 408 can use the filled in data and/or entity types specified by the column headings to extract the proper relationship between the two entities. Once the relationship has been extracted, the same relationship applies to all the missing data in the table 202. The statement validation process 414 can also be used to validate already entered data.

Finally, a loop can be formed around statement validation process 414 so that for each row in the table that has missing data, a statement can be created with the entity that is known (the national park in table 202) and the relationship previously extracted. The entity/relationship pair can then be used by the statement validation process 414 to identify the correct missing entity.

Example Machine Architecture and Machine-Readable Medium

Figure 9:
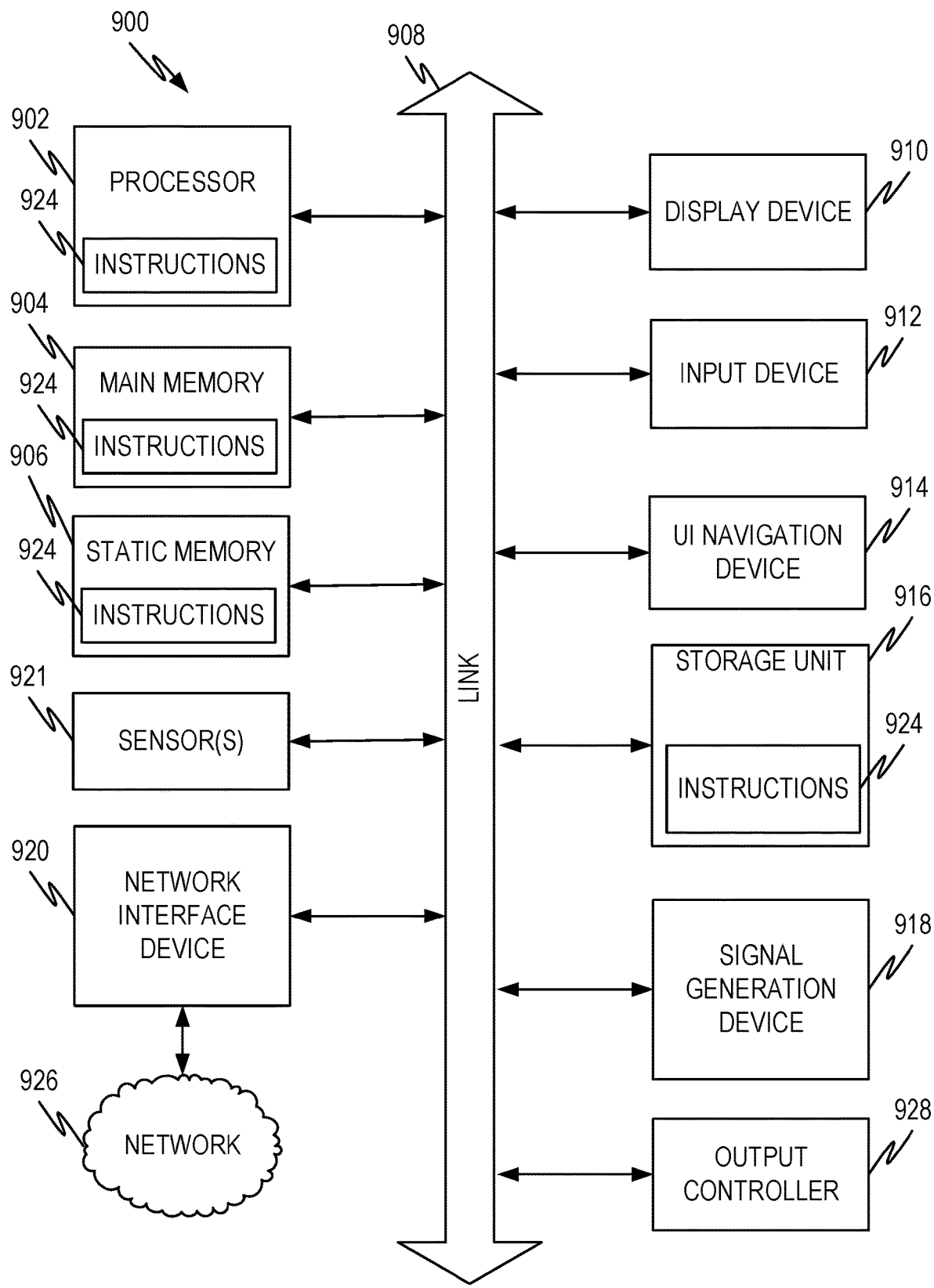
FIG. 9 illustrates a representative machine architecture suitable for implementing the systems and other aspects disclosed herein or for executing the methods disclosed herein.

FIG. 9 illustrates a representative machine architecture suitable for implementing the systems and other aspects disclosed herein or for executing the methods disclosed herein. The machine of FIG. 9 is shown as a standalone device (such as the mobile devices described herein), which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), an eye tracking subsystem, and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless) to connect to and/or communicate over one or more networks 926.

Rather than the more conventional microprocessor, Neural Network chips can be used to implement embodiments of the present disclosure. Neural Network chips are specialized chips designed to execute various forms of neural networks and can be used in the MRC models or other machine learning models that are utilized in the embodiments. As such, they are suitable for use in implementing aspects of the present disclosure such as the machine learning models and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method, comprising:
receiving a statement comprising an entity and a predicate indicating a relationship of the entity to at least one attribute or at least one other entity;
identifying, using a first model, a list of candidate entities in the statement;
identifying, using a second model, a list of candidate predicates in the statement;
creating a plurality of entity-predicate pairs from the list of candidate entities and the list of candidate predicates;
for each entity-predicate pair, employing a knowledge repository to identify either suggested corrections to the statement or to validate the natural language statement; and present a subset of the suggested corrections or the validation or both to a user via a user interface.

Example 2

The method of example 1 wherein the statement is a natural language statement.

Example 3

The method of example 1 wherein the first model is a trained machine learning model that utilizes the knowledge repository.

Example 4

The method of example 1 wherein the second model is a trained machine learning model that utilizes the knowledge repository.

Example 5

The method of example 1 wherein the knowledge repository employs a given ontology and is represented as a knowledge graph.

Example 6

The method of example 1 wherein the subset of the suggested corrections is presented to the user using a drop-down selection list from which the user can select a desired correction, an indicator associated with incorrect information in the statement, or both.

Example 7

The method of example 8 wherein upon activating the indicator, a suggested correction is made to the statement, the user is informed as to a correction that will be made, or both.

Example 8

The method of example 1 wherein an indicator is presented that confirms validity of the statement.

Example 9

The method of example 1 wherein the knowledge repository is a knowledge graph and employing the knowledge repository to identify either suggested corrections to the statement or to validate the natural language statement comprises traversing the knowledge graph Example 10

A system comprising:
a processor and device-storage media having executable instructions which, when executed by the processor, cause the system to perform operations comprising:
receive a statement comprising an entity and a predicate indicating a relationship of the entity to at least one attribute or at least one other entity;
identify, using a first model, a list of candidate entities in the statement;
identify, using a second model, a list of candidate predicates in the statement;
create a plurality of entity-predicate pairs from the list of candidate entities and the list of candidate predicates;
for each entity-predicate pair, employ a knowledge repository to identify either suggested corrections to the statement or to validate the natural language statement; and
present a subset of the suggested corrections or the validation or both to a user via a user interface.

Example 11

The system of example 10 wherein the statement is a natural language statement:

Example 12

The system of example 10 wherein the first model is a trained machine learning model that utilizes the knowledge repository:

Example 13

The system of example 10 wherein the second model is a trained machine learning model that utilizes the knowledge repository.

Example 14

The system of example 10 wherein the knowledge repository employs an ontology and is represented by a knowledge graph.

Example 15

The system of example 10 wherein the subset of the suggested corrections is presented to the user using a drop-down selection list from which the user can select a desired correction, an indicator associated with incorrect information in the statement, or both.

Example 16

A computer implemented method, comprising:
receiving a statement comprising an entity and a predicate indicating a relationship of the entity to at least one attribute or at least one other entity;
identifying, using a first model, a list of candidate entities in the statement;
identifying, using a second model, a list of candidate predicates in the statement;
creating a plurality of entity-predicate pairs from the list of candidate entities and the list of candidate predicates;
for each entity-predicate pair, employing a knowledge repository to identify either suggested corrections to the statement or to validate the natural language statement; and
present a subset of the suggested corrections or the validation or both to a user via a user interface.

Example 17

The method of example 16 wherein the statement is a natural language statement.

Example 18

The method of example 16 or 17 wherein the first model is a trained machine learning model that utilizes the knowledge repository.

Example 19

The method of example 16, 17, or 18 wherein the second model is a trained machine learning model that utilizes the knowledge repository.

Example 20

The method of example 16, 17, 18, or 19 wherein the knowledge repository employs a given ontology and is represented as a knowledge graph.

Example 21

The method of example 16, 17, 18, 19, or 20 wherein the subset of the suggested corrections is presented to the user using a drop-down selection list from which the user can select a desired correction.

Example 22

The method of example 16, 17, 18, 19, 20, or 21 wherein the subset of the suggested corrections is presented to the user using an indicator associated with incorrect information in the statement.

Example 23

The method of example 22 wherein upon activating the indicator, a suggested correction is made to the statement, the user is informed as to a correction that will be made, or both.

Example 24

The method of example 16, 17, 18, 19, 20, 21, 22, or 23 wherein an indicator is presented that confirms validity of the statement.

Example 25

The method of example 16, 17, 18, 19, 20, 21, 22, 23, or 24 wherein the knowledge repository is a knowledge graph and employing the knowledge repository to identify either suggested corrections to the statement or to validate the natural language statement comprises traversing the knowledge graph.

Example 26

The method of example 16, 17, 18, 19, 20, 21, 22, 23, 24, or 25 further comprising resolving coreferences in the statement.

Example 27

The method of example 26 wherein the coreferences are resolved using at least one natural language model.

Example 28

The method of example 16, 17, 18, 19, 20, 21, 22, 23, 24, 25, 26, or 27 wherein the subset of suggested corrections suggests a plurality of ways in which the statement can be corrected.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method, comprising:
    receiving an unchecked statement from a source seeking to validate or to correct the statement, the statement comprising an entity and a predicate indicating a relationship of the entity to at least one attribute or at least one other entity;
    identifying, using a first model, a list of candidate entities in the unchecked statement;
    identifying, using a second model, a list of candidate predicates in the unchecked statement;
    creating a plurality of entity-predicate pairs from the list of candidate entities and the list of candidate predicates;
    for each entity-predicate pair, employing a knowledge repository to identify either suggested corrections to the statement or to validate the statement; and
    presenting a subset of the suggested corrections or the validation or both to a user via a user interface.

2. The method of claim 1 wherein the unchecked statement is a natural language statement.

3. The method of claim 1 wherein the first model is a trained machine learning model that utilizes the knowledge repository.

4. The method of claim 1 wherein the second model is a trained machine learning model that utilizes the knowledge repository.

5. The method of claim 1 wherein the knowledge repository employs a given ontology and is represented as a knowledge graph.

6. The method of claim 1 wherein the subset of the suggested corrections is presented to the user using a drop-down selection list from which the user can select a desired correction, an indicator associated with incorrect information in the statement, or both.

7. The method of claim 1 wherein an indicator is presented that confirms validity of the statement.

8. The method of claim 7 wherein upon activating the indicator, a suggested correction is made to the statement, the user is informed as to a correction that will be made, or both.

9. The method of claim 1 wherein the knowledge repository is a knowledge graph and employing the knowledge repository to identify either suggested corrections to the unchecked statement or to validate the unchecked statement comprises traversing the knowledge graph.

10. A system comprising:
a processor and device-storage media having executable instructions which, when executed by the processor, cause the system to perform operations comprising:
receive a statement from a source seeking to validate or to correct the statement, the statement comprising an entity and a predicate indicating a relationship of the entity to at least one attribute or at least one other entity;
identify, using a first model, a list of candidate entities in the statement, the first model receiving the statement and producing a list of candidate entities;
identify, using a second model, a list of candidate predicates in the statement, the second model receiving the statement and producing a list of candidate predicates;
create a plurality of entity-predicate pairs from the list of candidate entities and the list of candidate predicates;
for each entity-predicate pair, employ a knowledge repository to identify either suggested corrections to the statement or to validate the statement; and
present a subset of the suggested corrections or the validation or both to a user via a user interface.

11. The system of claim 10 wherein the statement is a natural language statement.

12. The system of claim 10 wherein the first model is a trained machine learning model that utilizes the knowledge repository.

13. The system of claim 10 wherein the second model is a trained machine learning model that utilizes the knowledge repository.

14. The system of claim 10 wherein the knowledge repository employs an ontology and is represented by a knowledge graph.

15. The system of claim 10 wherein the subset of the suggested corrections is presented to the user using a drop-down selection list from which the user can select a desired correction, an indicator associated with incorrect information in the statement, or both.

16. The system of claim 15 wherein upon activating the indicatory, a suggested correction is made to the statement, the user is informed as to a correction that will be made, or both.

17. The system of claim 10 wherein an indicator is presented that confirms validity of the statement.

18. The system of claim 10 wherein the knowledge repository is a knowledge graph and employing the knowledge repository to identify either suggested corrections to the statement or to validate the statement comprises traversing the knowledge graph.

19. A computer storage medium comprising executable instructions that, when executed by a processor of a machine, cause the machine to perform acts comprising:
receive a natural language statement from a source seeking to validate or to correct the natural language statement, the natural language statement comprising an entity and a predicate indicating a relationship of the entity to at least one other entity;
identify, using a trained machine learning model, a list of candidate entities in the statement;
identify, using a second trained machine learning model, a list of candidate predicates in the statement;
create a plurality of entity-predicate pairs from the list of candidate entities and the list of candidate predicates;
for each entity-predicate pair, traverse a knowledge graph to identify either suggested corrections to the statement or to validate the natural language statement; and
present a subset of the suggested corrections or the validation or both to a user via a user interface.

20. The medium of claim 19 wherein the statement comes from a document processing application and wherein the suggested corrections are presented as part of the document processing application.

* * * * *